United States Patent [19]

Nakanishi

[11] Patent Number: 4,939,606
[45] Date of Patent: Jul. 3, 1990

[54] ROTARY HEAD ASSEMBLY FOR DIGITAL AUDIO TAPE RECORDERS

[75] Inventor: Tsutomu Nakanishi, Kunitachi, Japan

[73] Assignee: C.S.U. Ltd., Tokyo, Japan

[21] Appl. No.: 177,587

[22] Filed: Apr. 5, 1988

[30] Foreign Application Priority Data

| Apr. 13, 1987 | [JP] | Japan | 62-54708 |
| Jul. 3, 1987 | [JP] | Japan | 62-101865 |
| Nov. 13, 1987 | [JP] | Japan | 62-173617 |
| Dec. 28, 1987 | [JP] | Japan | 62-200788 |
| Dec. 28, 1987 | [JP] | Japan | 62-200789 |

[51] Int. Cl.⁵ .............................................. G11B 15/60
[52] U.S. Cl. .............................. 360/107; 360/130.23; 360/130.24; 360/85
[58] Field of Search .................. 360/84, 85, 95, 107, 360/130.21, 130.22, 130.23, 130.24, 130.3, 130.31, 130.32

[56] References Cited

U.S. PATENT DOCUMENTS

| 4,048,661 | 9/1977 | Starr | 360/130.24 |
| 4,366,516 | 12/1982 | Ogata et al. | 360/130.24 |
| 4,459,627 | 7/1984 | Kitagawa et al. | 360/130.24 |
| 4,686,597 | 8/1987 | Johnston | 360/130.23 |

Primary Examiner—John H. Wolff
Attorney, Agent, or Firm—Ladas & Parry

[57] ABSTRACT

This invention relates to a rotary head assembly to be used for digital audio tape recorders (DAT) and the like. A magnetic tape can be made to run parallelly with a drum, the apparatus can be made small and light and the mechanism can be simplified.

18 Claims, 12 Drawing Sheets

ROTARY HEAD ASSEMBLY FOR DIGITAL AUDIO TAPE RECORDERS

BACKGROUND OF THE INVENTION

This invention relates to a rotary head assembly to be used to record and reproduce signals in magnetic tapes in digital audio tape recorders (DAT) and the like.

In digital audio tape recorders and the like, the band of signals to be recorded is so wide that it is necessary to elevate the relative speed between the magnetic tape and magnetic head and therefore a rotary head system rotating the magnetic head is generally adopted. Also, an oblique scanning in which the scanning line is made obligue is adopted to take the recording time of the magnetic tape to be long.

Figure 22:
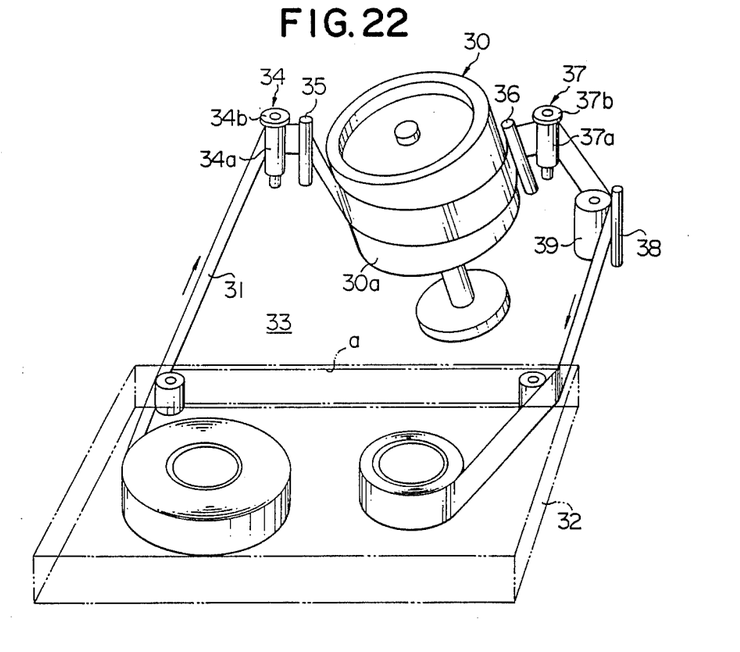
FIGS. 22 and 23 illustrate a conventional embodiment.

FIG. 22 shows the essential part of a conventional digital audio tape recorder adopting a rotary head system. In the drawing, a rotary head 30 is provided as inclined with respect to a tape cassette 32 containing a magnetic tape 31. The magnetic tape 31 pulled out of the tape cassette 32 is obliquely wound on a drum 30a of the rotary head 30 through an inlet tape guide roller 34 and inlet side inclined guide 35 provided on a body 33 of the digital audio tape recorder and is returned to the tape cassette 32 as held by a capstan shaft 38 and pinch roller 39 through an outlet side inclined guide 36 and outlet tape guide roller 37. By the way, the inlet inclined guide 35 and outlet inclined guide 36 are guides for obliquely winding on the drum 30a without loosening the magnetic tape 31 parallelly wound and contained in the tape cassette 32.

Figure 23:
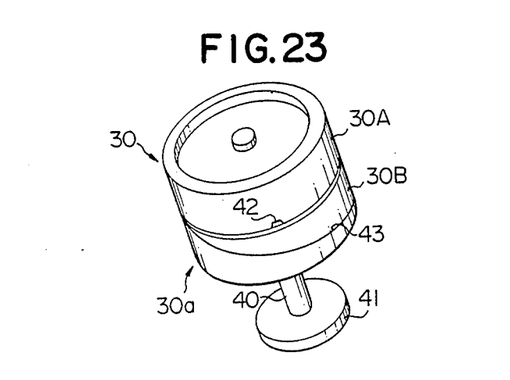

FIG. 23 shows the rotary head 30 formed of an upper drum 30A rotating at a high speed with a power obtained by a motor shaft 40 and moter part 41 and a lower drum 30B on the fixed side. A magnetic head 42 is provided as exposed on the periphery of the upper drum 30A. The lower drum 30B is proved with a leading groove 43 so that the magnetic tape 31 may be wound on the drum 30a at a predetermined angle of inclination. The magnetic tape 31 is positioned as held by flanges 34b and 37b provided respectively on the inlet tape guide roller 34 and outlet tape guide roller 37 and the leading groove 43 so as to run stably.

In the above described conventional formation shown in FIG. 22 and 23, the drum 30a of the rotary head 30 is of a two-step formation of the upper drum 30A and lower drum 30B and is inclined obliquely with respect to the tape case and therefore there has been a defect that the apparatus can not be made small in the size. Also, a plastic molding is considered to reduce the cost and weight of such rotary head 30 but, as the upper drum 30A and lower drum 30B are precisely worked and rotated, there is a defect that it is difficult to guarantee the precision of working them.

Also, in a helical scanning system developed with such video tape recorder as is described above as a center, as the angle of winding the magnetic tape 31 on the drum 30a of the rotary head assembly 30 is larger than about 180 degrees, such guide parts as the inlet tape guide roller 34, inlet inclined guide 35, outlet inclined guide 36, outlet tape guide roller 37 and pinch roller 39 must be moved along a predetermined track to pull out the magnetic tape 31 to the illustrated position from the initial tape position a within the tape cassette 37 and wind it and therefore there has been a defect that it is difficult to meet the positioning precision required therefor.

Further, plasticizing is expected from the object of making the rotary head assembly light. However, in the conventional structure, such many problems as of the precison, the phase detection of the motor rotating the rotating disc and the static electricity by the friction produced by the magnetic tape made of plastics are left unsolved.

SUMMARY OF THE INVENTION

This invention is suggested in view of the above mentioned points. Its object is to provide a rotary head assembly whereby, when the drum structure of the rotary head is to be made simple and light, such other mechanism as the tape guide roller can be easily designed and the number of parts can be greatly reduced.

That is to say, in order to attain the above mentioned object, the present invention purports a rotary head assembly comprising a fixed tape winding drum having a curved surface on which a magnetic tape runs, a curve correcting the distortion of the locus of the head trace recorded on the above mentioned magnetic tape by magnetic heads and keeping the angle of a predetermined format and a flange part positioning the above mentioned magnetic tape at one end and provided on the above mentioned curved surface with a head passing slot; a head rotating disc provided obliquely on the back side of the above mentioned curved surface so that the magnetic heads arranged on the periphery may be exposed through the above mentioned head passing slot; and a tape push pushing the above mentioned magnetic tape against the curve of the above mentioned flange part.

BRIEF DESCRIPTION OF THE DRAWINGS

FIGS. 1 to 8 show the first embodiment of a rotary head assembly of the present invention.

FIG. 3 is a perspective view showing the same as incorporated in a digital audio tape recorder or the like.

FIGS. 9 and 10 show the second embodiment of the present invention.

FIG. 10 is a perspective view of the same as incorporated in a digital audio tape recorder or the like.

DESCRIPTION OF THE PREFERRED EMBODIMENTS

(First Embodiment)

Figure 1:
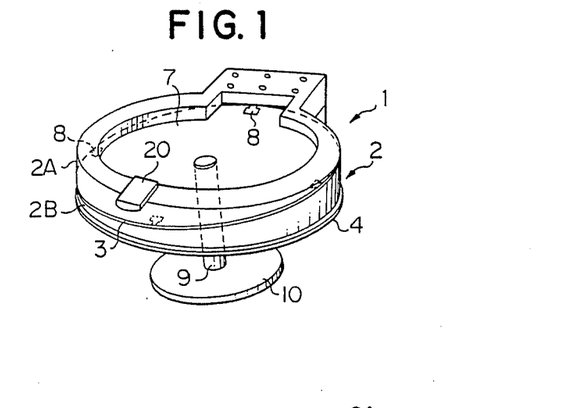
FIG. 1 is a perspective view of the rotary head assembly.
Figure 2:
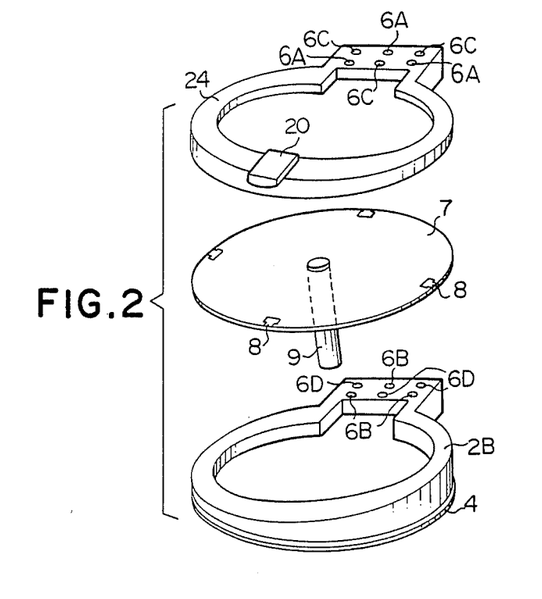
FIG. 2 is a perspective view of the same as disassembled.

In FIGS. 1 and 2, the reference numeral 2 represents a tape winding drum on which a magnetic tape runs. This tape winding drum 2 is formed of an upper drum 2A and a lower drum 2B. A flange part 4 positioning a magnetic tape at one end and having on a magnetic tape sliding contact surface a curve correcting the distortion of a locus traced by magnetic heads 8 when the magnetic tape runs on the curved surface of the tape winding drum 2 is formed at the lower end of the lower drum so that, when the upper drum 2A and lower drum 2B are combined with each other, a head passing slot 3 may be formed on the curved surface on which the magnetic tape runs. As the correcting curve formed in the flange part 4 is waved as describe later and reduces in the close contact in the valley, at the upper end of the upper drum 24, one or more tape pushers 20 are provided in opposition to the valley of the curve to run the magnetic tape along the curve. On the other hand, a head rotating disc 7 having magnetic heads 8 arranged on the periphery is obliquely arranged within the tape winding drum 2 so that the magnetic heads 8 may be exposed through the head passing slot 3 of the tape winding drum 2. As the head rotating disc 7 rotates around an inclined axis the curved surface on which the magnetic tape runs on the tape winding drum 2 will be substantially elliptical. As it is necessary to expose the magnetic head 8 over an angle of about 90 degrees in case it is applied to an ordinary digital audio tape recorder or the like, it is impossible to incorporate the head rotating disc 7 after the winding drum 2 is assembled. Therefore, the tape winding drum 2 can be disassembled into two members (the upper drum 2A and lower drum 2B) along the head passing slot 3 as a boundary. However, if the magnetic head 8 exposing angle is so small that the head rotating disc 7 can be easily incorporated later, the tape winding drum 2 may be integrally formed. The curved surface on which the magnetic tape runs on the tape winding drum 2 can be machined with sufficient precision on an NC machine tool or the like. However, in the case of dividing the drum into two parts, the drum must be disassembled once to incorporate the head rotating disc 7, therefore tapered pins or the like are struck into holes 6A and 6B, screws are secured in screw holes 6C and 6D and the drum is thus worked, is disassembled and is then assembled by being positioned again by the tapered pins or the like so as to prevent the reduction of the precision. On the other hand, the reference numeral 9 represents a motor shaft and 10 represents a motor part (motor or pulley). The rotary head assembly 1 is formed of these.

Figure 3:
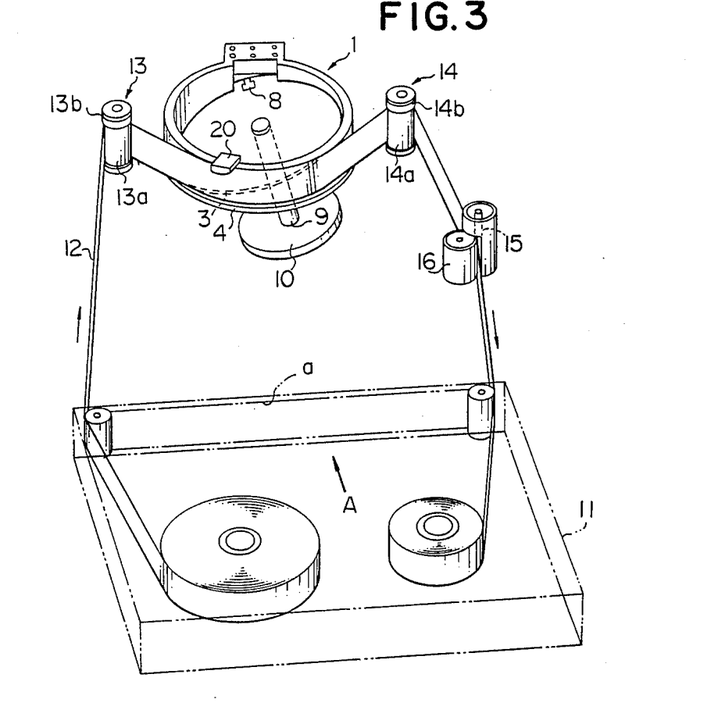
Figure 4:
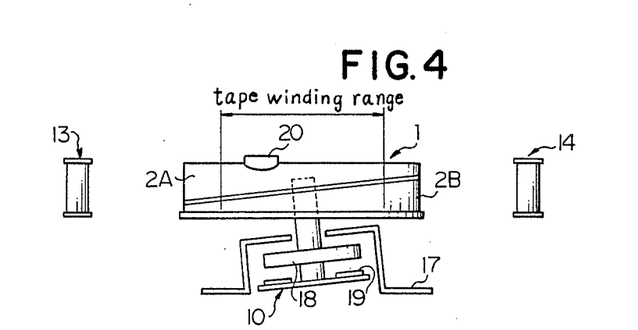
FIG. 4 is a view as seen in the direction indicated by the arrow A.

FIG. 3 shows the rotary head assembly 1 of FIG. 1 as incorporated in a digital audio tape recorder or the like. A magnetic tape 12 pulled out of a tape cassette 11 returns again to the tape cassette 11 through an inlet tape guide roller 13, rotary head assembly 1, outlet tape guide roller 14, capstan shaft 15 and pinch roller 16. By the way, in order to make the tape travel easy, an inlet inclined guide or outlet inclined guide may be used as required. FIG. 4 is a view of an essential part as seen in the direction indicated by the arrow A in FIG. 3. The reference numeral 17 represents a frame and 18 and 19 represent respectively a magnet and coil of motor part 10.

If the tape cassette 11 is to be set in a digital audio tape recorder or the like, the magnetic tape 12 is in the initial position A, the inlet tape guide roller 13, outlet tape guide roller 14 and pinch roller 16 move in the same plane to the illustrated positions from inside the magnetic tape 12 and the magnetic tape 12 is wound on the rotary head assembly 1. The magnetic tape 12 is held between the capstan shaft 15 and pinch roller 16 and runs on the curved surface of the rotary head assembly 1 at a fixed speed and the magnetic heads 8 move at a high speed along the head passing slot 3 provided on this curved surface to record or reproduce signals.

Figure 5:
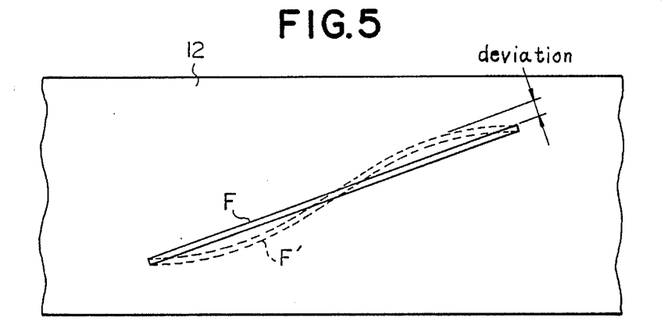
FIG. 5 is a developed plan view of ahead trace locus of a magnetic head on a magnetic tape.

Now, FIG. 5 shows a locus of the head trace of the magnetic head 8 on the magnetic tape 12 as developed in a plane F and represents a standard format. However, as the magnetic head 8 moves on the periphery as inclined, in case the magnetic tape 12 is merely run parallel, the locus of the head trace will be distorted as in F'. The drawing shows the distortion as considerably exaggerated. The deviation is of such minute amount as about 0.05 mm. Therefore, in this invention, a correcting curve deviated in a waveform in the width direction of the magnetic tape 12 is formed in the flange part 4 of the lower drum 2B and further the magnetic tape 12 is made to closely contact the flange part 4 by one or more tape pushes 20 so as to correct the distortion of the locus of the head trace. That is to say, a deviation corresponding to the difference between the standard format F and distorted format F' is given to the flange part 4 as a wave in the vertical direction and the magnetic tape 12 as distorted is contacted with the magnetic head 8 so that the distortion may be canceled and the distorted format F' may coincide with the standard format F.

Figure 6:
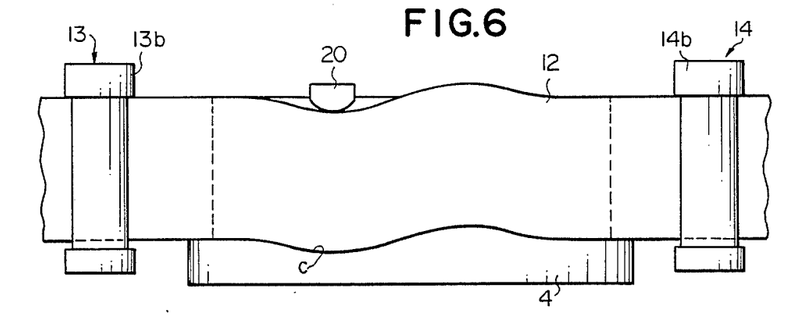
FIG. 6 is a view showing a width derection deviation in the running state of a magnetic tape.

FIG. 6 shows as exaggerated a deviation in the width direction in the running state of the magnetic tape 12. The magnetic tape 12 is pushed against the flange part 4 by the flange 13b of the inlet tape guide roller 13, one or more tape pushes 20 and the flange 14b of the outlet tape guide roller 14 and runs as distorted in the width direction though slightly. By the way, in the valley of the curve C of the flange part 4, the magnetic tape 12 tends to run straight and is likely to float up and therefore the tape pushes 20 are opposed to this valley.

Figure 7A:
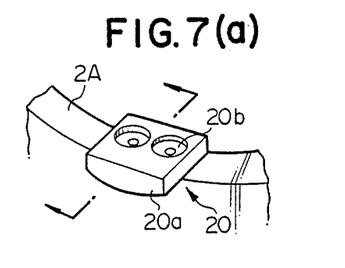
FIGS. 7a, 7b and 8a, 8b show embodiments of a tape push.
Figure 7B:
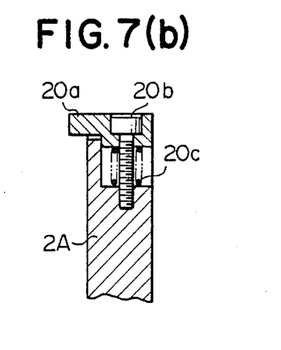
Figure 8A:
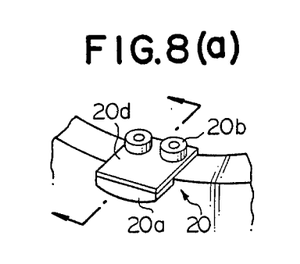
Figure 8B:
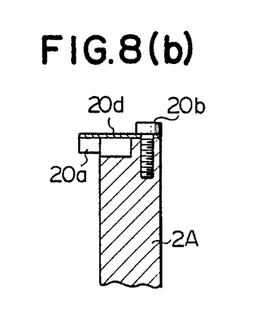

By the way, FIGS. 7a, 7b and 8a, 8b show a concrete examples of the tape push 20. Therein, FIG. 7a is a perspective view and FIG. 7b is a sectional view in FIG. 7a. A tape pushing piece 20a is resiliently fixed to the upper drum 2A by two screws 20b and to prevent resonance rubber dampers (not shown) or the like and two springs 20c are interposed and the piece 20a is slightly movable in the width direction and the running direction of the magnetic tape and therefore the tape can be automatically adjusted. In FIGS. 8a and 8b, the tape pushing piece 20a is prevented from resonating by rubber dampers or the like (not shown) and being resiliently fixed to the upper drum 2A by screws 20b and plate spring 20d so as to push the tape pushing piece 20a downward with only the spring pressure of the plate spring 20d. In FIGS. 7a and 8a, it is seen that, the side of the tape pushing piece 20a in contact with the magnetic tape is shaped to be round so as not to damage the magnetic tape.

In the above mentioned embodiment, the flange part 4 is at the lower end of the lower drum 2B but it may be provided on the upper side of the tape winding drum 2 and, accordingly the tape pusher 20 and the flanges 13b and 14b of the inlet tape guide roller 13 and outlet tape guide roller 14 may be on the lower side.

(Second Embodiment)

Figure 9:
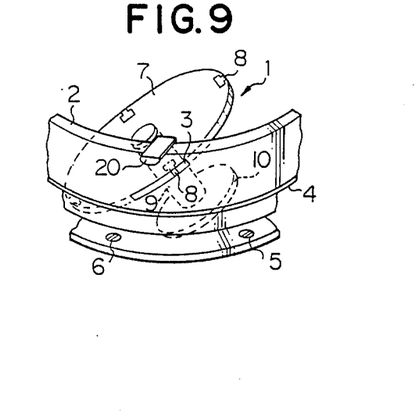
FIG. 9 is perspective view of a rotary head assembly.
Figure 10:
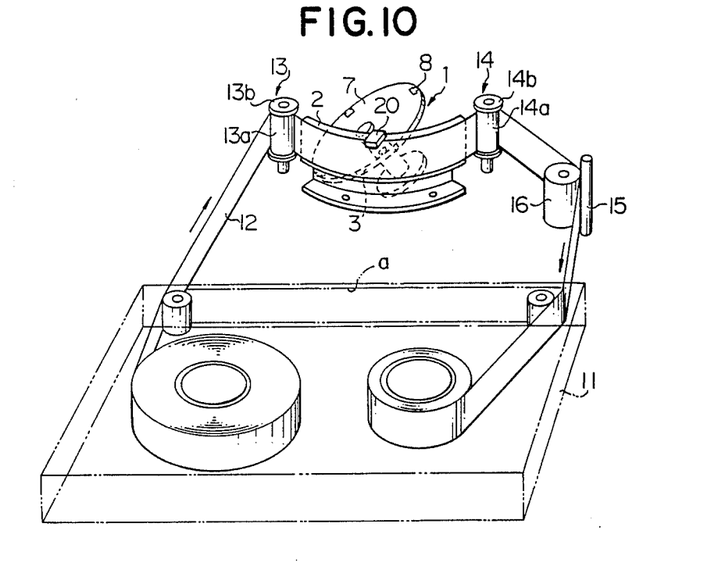

FIGS. 9 and 10 show the second embodiment of the present invention. FIG. 9 is a perspective view of a rotary head assembly. FIG. 10 is a view showing the same as incorporated in a digital audio tape recorder or the like.

In FIG. 9, the reference numeral 2 represents a tape winding drum on which a magnetic tape runs. Only the part to be in contact with the magnetic tape is shown and the rear shape may be any not obstructing the rotation of the head rotating plate 7. A flange part 4 positioning the magnetic tape at one end and having a curved surface correcting the distortion of the locus traced by the magnetic heads 8 in case the magnetic tape runs on the curved surface of the tape winding drum 2 is formed on the tape winding drum 2 and is fixed at the lower end to the frame with fitting screws 5 and 6. Further, a tape push 20 for closely contacting the magnetic tape with the flange part 4 is provided at the upper end of the tape winding drum 2.

A head passing slot 3 is formed on the curved surface on which the magnetic tape runs of the tape winding drum 2. A head rotating disc 7 having magnetic heads 8 arranged on the periphery is obliquely arranged on the back side of the tape winding drum 2 so that the magnetic heads 8 may be exposed out of the head passing slot 3 of the tape winding drum 2. By the way, as the head rotating disc 7 rotates as inclined, the plan shape of the curved surface near the head passing slot 3 of the tape winding drum 2 will be substantially a part of an ellipse. As the head rotating disc 7 is provided at a sharp angle, the rate of the exposed angle of the magnetic head 8 on the entire periphery of the head rotating disc 7 is so small that, even in case the tape winding drum 2 is integrally formed, it will be able to be assembled. That is to say, in case the exposed angle of the magnetic head 8 is large, the tape winding drum 2 will have to be divided into two members along the head passing slot as a boundary but, in this second embodiment, such consideration is not necessary. By the way, the curved surface on which the magnetic tape runs of the tape winding drum 2 can be worked precisely enough by an NC machine tool or the like. On the other hand, the refernce numeral 9 represents a motor shaft and 10 represents a motor part (motor or pulley). A rotary head assembly 1 is formed of these.

FIG. 10 shows the rotary head assembly 1 of FIG. 9 as incorporated in a digital audio tape recorder or the like. A magnetic tape 12 pulled out of a tape cassette 11 returns again to the tape cassette 11 through an inlet tape guide roller 13, rotary head assembly 1, outlet tape guide roller 14, capstan shaft 15 and pinch roller 16.

In case the tape cassette 11 is to be set in a digital audio tape recorder or the like, the magnetic tape 12 is in the initial position A, the inlet tape guide roller 13, outlet tape guide roller 14 and pinch roller 16 move in the same plane to the illustrated positions from inside the magnetic tape 12 and contact the magnetic tape 12 with the tape winding drum 2 of the rotary head assembly 1. The magnetic tape 12 is held between the capstan shaft 15 and pinch roller 16 and runs at a fixed speed on the curved surface of the rotary head assembly 1 and the magnetic heads 8 move at a high speed along the head passing slot provided on the curved surface to record or reproduce signals. By the way, as the angle scanned by the magnetic head 8 is sharper than the angle of the ordinary oblique scanning, it is necessary to increase the running speed of the magnetic tape 12 in response to it. The magnetic tape 12 is positioned as held by the flange part 4 of the rotary head assembly 1, the tape push 20 and the flanges 13b and 14b of the inlet tape guide roller 13 and output tape guide roller 14, has the distortion corrected and is made to stably run.

As explained above the angle of winding the magnetic tape on the drum is about 90 degrees in such magnetic recording and reproducing apparatus as a digital audio tape recorder and the rotary head assembly provided with a fixed tape winding drum has made it possible to parallelly run the magnetic tape. Therefore the rotary head assembly is provided with a loading mechanism shown in the third embodiment or fourth embodiment.

(Third Embodiment)

Figure 11A:
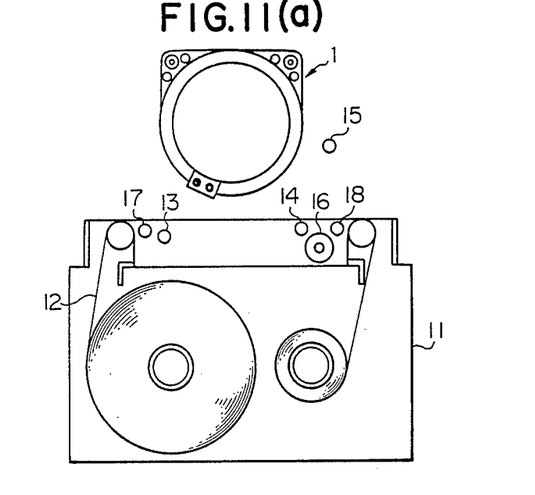
FIGS. 11a and 11b show the third embodiment in plan view of a rotary head assembly loading mechanism, FIG. 11a being before a tape cassette is fitted and FIG. 11b being after it is fitted.
Figure 11B:
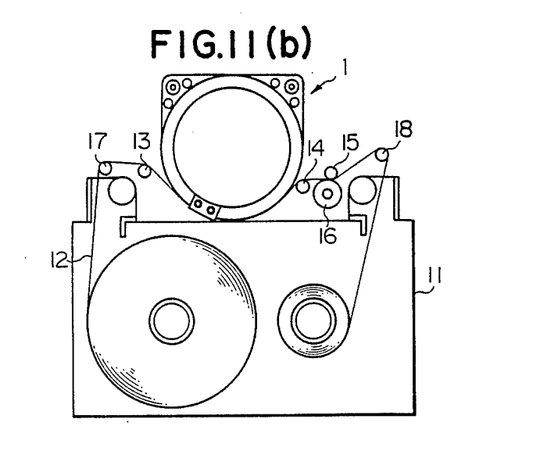

FIGS. 11a and 11b show a tape loading mechanism of the third embodiment of the present invention. FIG. 11a shows the state in which a tape cassette is set before a magnetic tape is loaded and FIG. 11b shows the state after the magnetic tape is loaded.

In FIGS. 11a and 11b, the reference numeral 1 represents a rotary head assembly enabling a magnetic tape to run parallelly and fixed to a main chassis of a digital audio tape recorder or the like and 11 represents a tape cassette to be set in a pocket or the like provided in a chassis of a digital audio tape recorder or the like. On the other hand, 13 represents an inlet tape guide roller and 14 represents an outlet tape guide roller. The inlet tape guide roller 13 is fitted to a driving mechanism moving when the tape is wound. The outlet tape guide roller 14 is fixed to a cassette chassis. Also, a tension regulator 17 pinch roller 16 and pull-out arm 18 are fitted to the driving mechanism moving when the tape is wound. A capstan 15 is fixed to the main chassis.

In the operation, when the tape cassette 11 is set in a pocket or the like of the cassette chassis as in (a), the tension regulator 17, inlet tape guide roller 13, outlet tape guide roller 14, pinch roller 16 and pull-out arm 18 will be positioned inside a magnetic tape 12. In case the tape cassette 11 is approached to the rotary head assembly 1 as in (b), the tension regulator 17, inlet tape guide roller 13, pinch roller 16 and pull-out arm 18 will move in a predetermined track, the outlet tape guide roller 14 fixed to the cassette chassis will move together with the tape cassette 11 and the magnetic tape 12 will be wound on the rotary head assembly 1 as illustrated, will be held by the capstan 15 and pinch roller 16 fixed to the main chassis and will be run.

The precision of positioning the magnetic tape 12 will be determined mostly by the inlet tape guide roller 13 and outlet tape guide 14. As the outlet tape guide roller 14 on one side can be fixed to the cassette chassis, the precision will be easy to obtain and the manufacture will be simple.

(Fourth Embodiment)

Figure 12A:
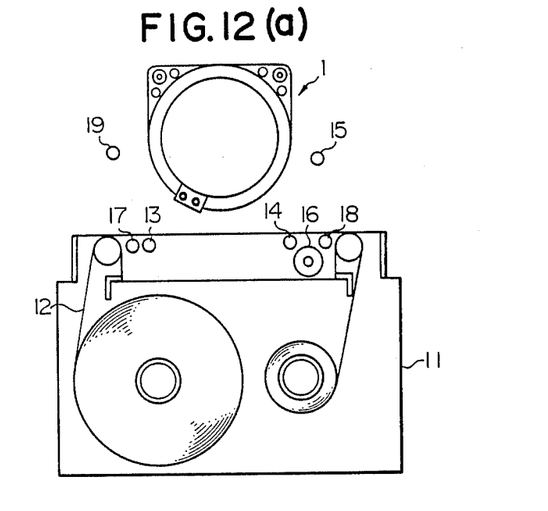
FIGS. 12 and 12b show the fourth embodiment in plan view of a rotary head assembly loading mechanism, FIG. 12a being before a tape cassette is fitted and FIG. 12b being after it is fitted.
Figure 12B:
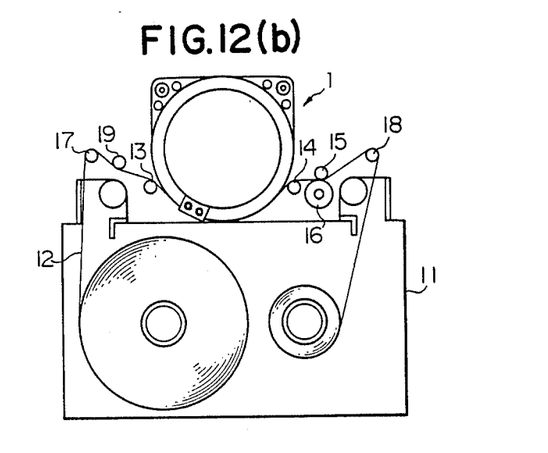

FIGS. 12a and 12b show the fourth embodiment. It is different from the third embodiment in that the inlet tape guide roller 13 is provided as fixed to the cassette chassis and an angle correcting guide 19 is newly provided as fixed to the main chassis. By the way, the other formations and operations are the same and therefore shall not be explained here. In this embodiment, as the inlet tape guide roller 13 can be also fixd, the precision can be further elevated, the manufacturing step can be simplified, the cost can be reduced and the energy can be economized.

(Fifth Embodiment)

Now, for the popularization of the digital audio tape recorder or the like, the cost reduction of the above mentioned rotary head assembly is the greatest problem. The tape winding drum made of plastics (resin) is considered to be prospective as a measure.

An embodiment in which a winding drum made of plastics in the rotary head assembly described in the first embodiment is used shall be explained as the fifth embodiment in the following.

Figure 13A:
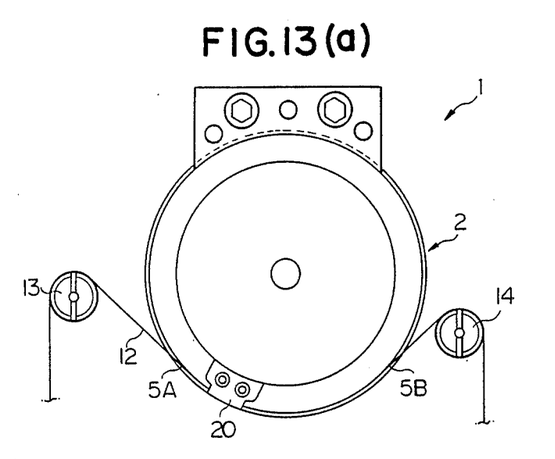
FIGS. 13a and 13b are respectively plane and elevational views of a rotary head assembly made of plastics according to a fifth embodiment.
Figure 13B:
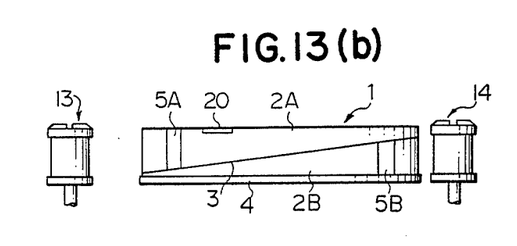

FIGS. 13a and 13b show an embodiment of the rotary head assembly of the present invention. Therein, FIG. 13a is a plan view of the rotary head assembly as wound with a magnetic tape and FIG. 13b is an elevation view and no magnetic tape is wound.

In FIGS. 13a and 13b the reference numeral 1 represents a fixed drum type rotary head assembly enabling a magnetic tape to run parallelly and made to be wound with a magnetic tape 12 over a predetermined angle (of about 90 degrees in a digital audio tape recorder) of a tape winding drum 2 of the rotary head assembly 1 by an inlet tape guide roller 13 and outlet tape guide roller 14 provided on both sides. Grounding parts 5A and 5B consisting of conductive members are provided near the inlet and outlet of a tape running part (magnetic tape 12 winding part) of the tape winding drum 2 and are connected to the chassis or the like through lead wires or the like. By the way, in case the amount of static electricity generated is comparatively low, only one of the grounding parts 5A and 5B will suffice. The earthing parts 5A and 5B are provided near the inlet and outlet of the tape running part, because, in case they are provided in the tape running part, the tape running surface will not become flat and the magnetic tape 12 will be distorted to have a bad influence on recording signals.

Figure 14A:
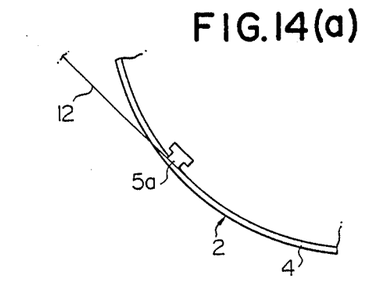
FIGS. 14a-14d show respective embodiments of a grounding part in FIGS. 13a and 13b.
Figure 14B:
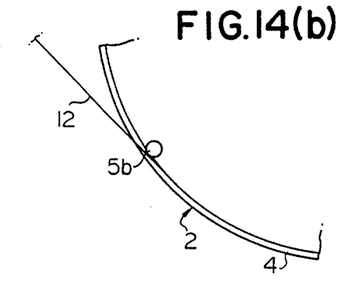
Figure 14C:
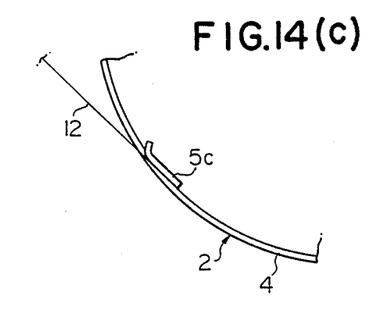
Figure 14D:
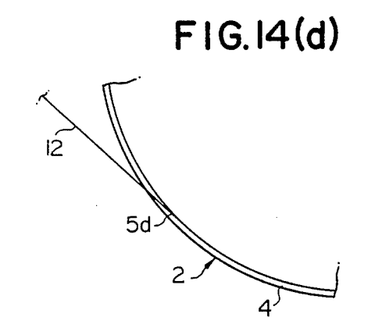

FIGS. 14a-14d show concrete formations of the grounding parts 5A and 5B in FIGS. 13a and 13b. Therein, FIG. 14a is of a small piece 5a made of conductive plastics as inserted from above and below the tape winding drum 2, FIG. 14b is of a metal bar 5b as inserted from above and below the tape winding drum, FIG. 14c is of a pressed metal piece 5c as pressed in the tape winding drum 2 and FIG. 14d is of a conductive paint 5d as applied to the tape winding drum 2. By the way, the grounding parts are connected to lead wires by soldering or by painting with a conductive bonding agent or conductive paint.

In FIGS. 13a and 13b and 14a-14d in case the magnetic tape 12 runs as wound on the tape winding drum 2 of the rotary head assembly 1, the magnetic tape 12 will contact the grounding parts 5A and 5B, the static electricity produced by the friction with the tape winding drum 2 will immediately vanish, the magnetic tape 12 will be prevented from closely contacting the tape winding drum 2 at the time of running and the recorded signal will not be adversely affected.

In the above described rotary head assembly, a motor rotation phase detecting part can be formed within the rotary head assembly, and no rotation phase detecting part is required in the motor part and therefore its size and cost can be greatly reduced.

Figure 15:
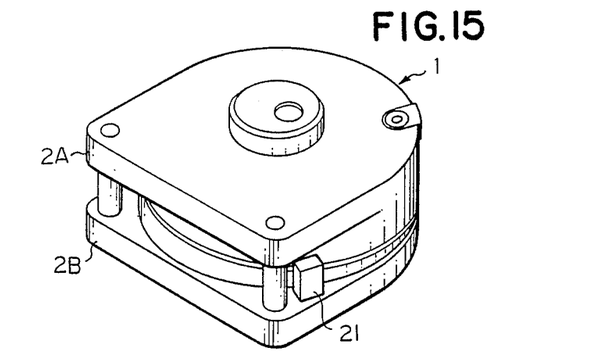
FIG. 15 is a perspective view showing a motor phase detecting element in a rotary head assembly.
Figure 16:
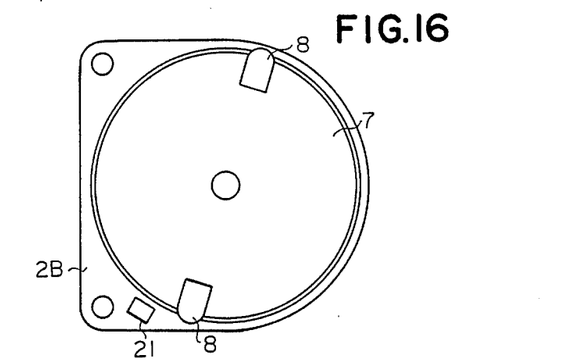
FIG. 16 is a plan view of the assembly in FIG. 15.

In FIG. 15, reference numeral 21 represents a magnet provided at the back surface of the tape at the lower drum 2B (which may also be the upper drum 2A). FIG. 16 is a view of the magnet with the upper drum 2A removed as seen from above. As the magnetic head 8 approaches the magnet 21 with the rotation of the rotating disc 7, the rotation phase of the motor can be detected from the output signal of the magnetic head 8. By the way, as the magnet 21 is provided at the back surface part of the tape, the magnetic head the magnetic tape will not be influenced in recording or reproducing signals.

Figure 17:
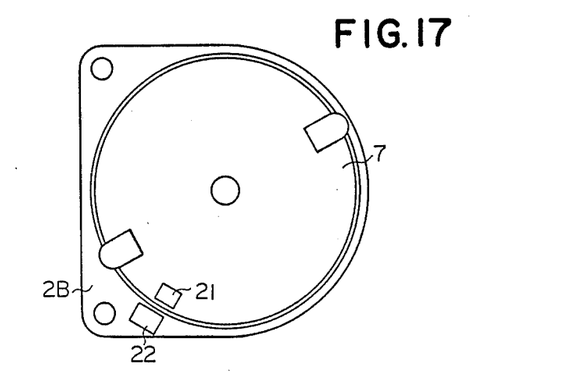
FIG. 17 is a plan view showing phase detection by a magnet and detecting element.

FIG. 17 is of another embodiment in which such detecting element 22 as a fixed head or coil is provided instead of the magnet 21 in FIG. 16 and further the magnet 21 is fitted on the head rotating disc 7. As the magnet 21 approaches the detecting element 22 with the rotation of the head rotating disc 7, the rotation phase of the motor can be detected with the detecting element.

Figure 18:
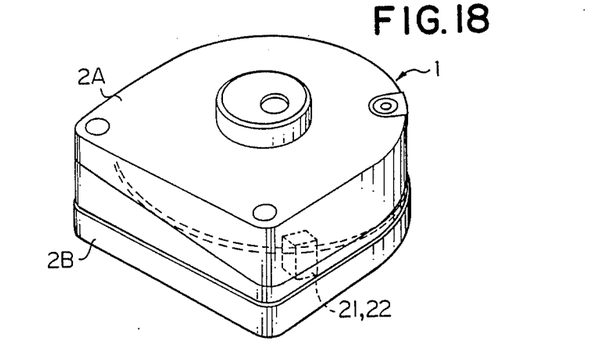
FIG. 18 is a perspective view showing a modification of FIG. 15.

FIG. 18 shows a rotary head assembly 1 wherein the upper drum 2A and lower drum 2B closely contact each other at the rear ends so as to be integral and the magnet 21 or detecting element 22 is completely contained in the rotary head assembly 1.

Figure 19A:
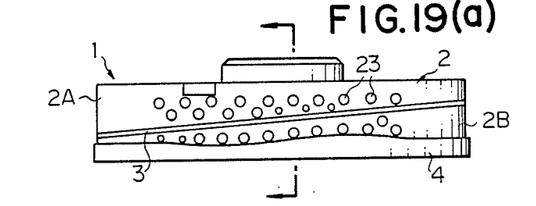
FIGS. 19a and 19b respectively illustrate an elevational section recesses provided in a tape winding drum.
Figure 19B:
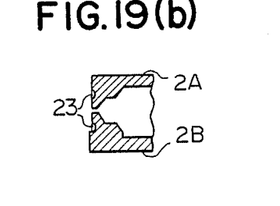

In the rotary head assembly made of plastics, the friction of the magnetic tape on the tape running surface will be so great that a plurality of recesses are made on the above mentioned running surface to prevent it. That is to say, as shown in FIGS. 19a and 19b, a plurality of recesses 23 consisting of small holes are formed on both sides of the head passing slot 3. By the way, as there is a freedom in the shape of a plastic molding, the plastic molding can be easily worked. Further, as the contact area of the tape winding drum 2 and magnetic tape on the tape running surface reduces by the area of the recesses 23, the friction between them will greatly reduce.

Figure 20A:
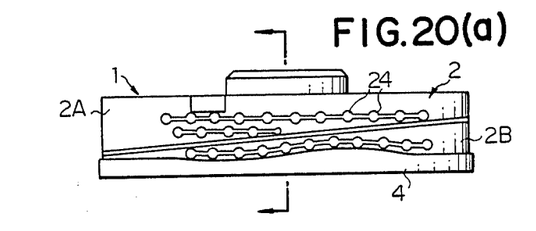
FIGS. 20a and 20b respectively illustrate an elevation and section continuous recesses provided in a tape winding drum.
Figure 20B:
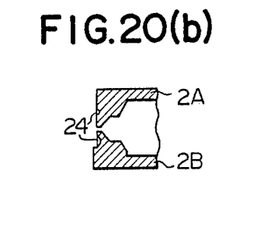

FIGS. 20a and 20b show another embodiment wherein a plurality of recesses 24 are formed by laterally connecting small holes through fine grooves. As an air flow is generated in the grooves of the recesses 24 by the running of the magnetic tape, there are advantages that the friction can be reduced and partial floating of the magnetic tape can be prevented.

Figure 21A:
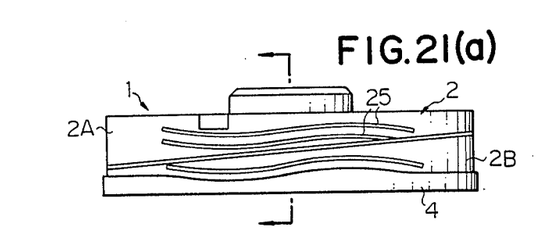
FIGS. 21a and 21b respectively illustrate an elevation and section waved recesses provided in a tape winding drum.
Figure 21B:
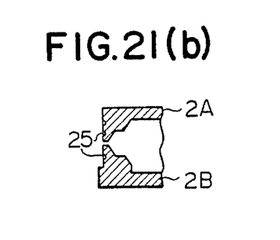

FIGS. 21a and 21b show another embodiment wherein a plurality of groove-like recesses 25 are made along wavy paths for the tape running guide provided in the flange part 4. As a force tending to move vertically along the curve of the recess 25 acts on the magnetic tape, there is an advantage that the tape running along the flange part 4 can be stabilized in addition to the friction reduction and partial floating prevention.

The present invention is formed as in the above and therefore has the following effects:

(1) The rotary head assembly of the present invention comprises a fixed tape winding drum having a curved surface on which a magnetic tape runs, a curve correcting the distortion of the locus of the head trace recorded on the above mentioned magnetic tape by magnetic heads and keeping the angle of a predetermined format and a flange part positioning the above mentioned magnetic tape at one end and provided on the above mentioned curved surface with a head passing slot; a head rotating disc provided obliquely on the back side of the above mentioned curved surface so that the magnetic heads arranged on the periphery may be exposed through the above mentioned head passing slot; and one or more tape pushed the above mentioned magnetic tape against the curve of the above mentioned flange part. Therefore: there are such effects that:

(a) The height dimension of the tape winding drum can be set to be about the width of the magnetic tape plus the thicknesses of the flange part and fitting part, further, as the tape winding drum is not required to be provided as inclined as before, the height of the rotary head assembly can be made low to make the apparatus small.

(b) As the magnetic tape is pulled out of the tape cassette and then runs in substantially the same plane without changing the direction, the mechanism for winding the magnetic tape on the tape winding drum may be simple and it will be easy to design and manufacture the apparatus.

(c) As the rotary head assembly can be formed mostly of only the tape winding drum and head rotating disc and no inclined guide is required the number of parts can be greatly reduced.

(d) The distortion of the locus of the trace of the magnetic head can be corrected by the flange part of the tape winding drum and one or more tape pushed so as to conform the locus to a standard format.

(2) The inlet tape guide roller, outlet tape guide roller and/or any other guide part for winding the magnetic tape on the above mentioned rotary head assembly is fixed to the main chassis to which the above mentioned rotary head assembly is fixed or to the cassette chassis in which the tape cassette is set. Therefore, there are such remarkable effects that:

(a) As such guide parts as the inlet tape guide roller and outlet tape guide roller are fixed, the positioning precision will improve.

(b) As the number of parts decreases and the guide parts which can be fixed increase, the manufacturing step can be simplified and the cost can be reduced.

(c) As the guide parts required to be driven to load the tape decrease, the energy consumed by the driving part can be made small, the rotary head assembly can be adapted to portable apparatus using batteries.

(3) In a rotary head assembly provided with a tape winding drum made of plastics, as earthing parts consisting of conductive members are provided near the inlet and/or outlet of the tape running part of the above mentioned tape winding drum, there are effects that, even if static electricity is generated by the friction of the magnetic tape with the tape winding drum, the static electricity with which the magnetic tape is charged will be removed by the earthing parts, the close contact of the magnetic tape with the tape winding drum when the tape runs will be prevented and there will be no bad influence on the recorded signals.

(4) as a magnetic detecting means which can detect the rotation phase of the above mentioned motor is provided in the back surface part of the above mentioned tape running surface of the upper drum or lower drum, the motor rotation phase detecting part can be formed within the rotary head assembly, no part for detecting the rotation phase is required in the motor part, therefore the rotary head assembly can be made very small and the cost can be reduced.

(5) As a plurality of recesses are provided on the tape running surface, there are effects that the area of contact with the magnetic tape can be made small, the friction will reduce greatly, the tape running will be stabilized and the wear of the tape winding drum and magnetic tape can be reduced.

What is claimed is:

1. A rotary head assembly comprising:
a fixed winding drum having a curved surface on which a magnetic tape runs, said drum having opposite ends and including a flange part at one end for engaging and positioning the magnetic tape laterally on said curved surface, said drum having a slot which is open at said curved surface, a rotating disc mounted within said fixed drum for rotation about an axis which is oblique relative to said drum, a plurality of circumferentially spaced heads on said disc which are exposed through said slot in the drum as said disc rotates, said heads tracing a path on the tape which is desirably rectilinear and forms a given angle on the tape but which tends to deviate from rectilinearity along a curved distortion path having peaks and valleys, said flange part having a surface which engages said tape, said surface of said flange part being curved to correct the deviation from the rectilinear path traced on the tape, push means on said drum for engaging the tape to push the tape against said curved surface of said flange part and means resiliently mounting said push means on said drum.

2. A rotary head assembly according to claim 1 wherein said curved surface on said flange part has a peak and valley, said push means facing the valley of the curved surface.

3. A rotary head assembly according to claim 1 or 2 wherein said push means includes a push part having a rounded surface for contacting the magnetic tape.

4. A rotary head assembly according to claim 1 wherein said drum includes two drum parts separated from one another to form a gap therebetween constituting said slot.

5. A rotary head assembly according to claim 1 comprising a tape loading mechanism including a first tape guiding roller positioned to guide the tape onto the drum, a second tape guiding roller positioned to guide the tape off the drum, guide means for said tape between the first and second rollers, and means fixing said winding drum in a position so that the tape runs on said drum.

6. A rotary head assembly according to claim 5 comprising a chassis supporting said rollers, said guide means and said winding drums.

7. A rotary head assembly according to claim 6 comprising means on said chassis for receiving a tape cassette.

8. A rotary head assembly according to claim 5 wherein said winding drum is made of plastic material and said assembly further comprises a grounding element made of conductive material, said grounding element being located proximate one of said rollers for contacting the tape.

9. A rotary head assembly according to claim 8 comprising a second one of said grounding elements located proximate the other of said rollers.

10. A rotary head assembly according to claim 9 wherein said tape winding drum is provided with a plurality of recesses at said curved surface on which the tape runs.

11. A rotary head assembly according to claim 1 comprising magnetic means facing said curved surface of the drum for cooperating with the magnetic tape running on the curved surface of the drum for detecting the rotation phase of a motor rotating said disc, the tape passing between the drum and the magnetic means.

12. A rotary head assembly according to claim 11 wherein said magnetic means is spaced from said slot.

13. A rotary head assembly according to claim 12 wherein said magnetic means comprises a magnet.

14. A rotary head assembly according to claim 12 wherein said magnetic means comprises a fixed head.

15. A rotary head assembly according to claim 12 wherein said magnetic means comprises a coil.

16. A rotary head assembly according to claim 1 wherein said winding drum is cylindrical.

17. A rotary head assembly according to claim 16 wherein said axis of the rotating disc forms an angle with respect to the axis of the drum, said slot being formed at an angle in said drum which is substantially equal to the angle of the axis of the rotating disc with respect to the axis of the drum.

18. A rotary head assembly according to claim 17 wherein said winding drum is disposed substantially horizontally and said tape travels substantially horizontally.

* * * * *